(12) United States Patent
Liu et al.

(10) Patent No.: US 8,591,847 B2
(45) Date of Patent: Nov. 26, 2013

(54) METHOD FOR REMOVING HYDROGEN SULFIDE FROM GASEOUS STREAM AT NORMAL TEMPERATURE

(75) Inventors: Zhenyi Liu, Beijing (CN); Zhiqiang Wu, Beijing (CN); Xiangsheng Wang, Beijing (CN)

(73) Assignee: Beijing Sanju Environmental Protection and New Material Co., Ltd., Beijing (CN)

( * ) Notice: Subject to any disclaimer, the term of this patent is extended or adjusted under 35 U.S.C. 154(b) by 0 days.

(21) Appl. No.: 13/172,898

(22) Filed: Jun. 30, 2011

(65) Prior Publication Data

US 2011/0256044 A1     Oct. 20, 2011

Related U.S. Application Data

(63) Continuation of application No. PCT/CN2009/001597, filed on Dec. 30, 2009.

(30) Foreign Application Priority Data

Dec. 30, 2008   (CN) .......................... 2008 1 0247540

(51) Int. Cl.
   *B01D 53/52*   (2006.01)
   *B01D 53/80*   (2006.01)
   *B01D 53/96*   (2006.01)

(52) U.S. Cl.
   USPC ........................... 423/231; 423/225; 423/230

(58) Field of Classification Search
   USPC ................... 423/220, 225, 230, 231
   See application file for complete search history.

(56) References Cited

U.S. PATENT DOCUMENTS

| | | | |
|---|---|---|---|
| 7,037,876 | B2 | 5/2006 | O'Brien et al. |
| 7,717,979 | B2 | 5/2010 | Liu et al. |
| 2005/0123470 | A1 | 6/2005 | Ayyer et al. |
| 2005/0247636 | A1 | 11/2005 | Schlegel |
| 2008/0047395 | A1 | 2/2008 | Liu et al. |
| 2008/0241055 | A1 | 10/2008 | Kawase et al. |
| 2009/0169470 | A1 | 7/2009 | Kawase |

FOREIGN PATENT DOCUMENTS

| | | |
|---|---|---|
| CN | 1121950 | 5/1996 |
| CN | 1133817 | 10/1996 |
| CN | 1034422 | 4/1997 |

(Continued)

OTHER PUBLICATIONS

Response filed Feb. 28, 2013 for U.S. Appl. No. 13/172,893.

(Continued)

*Primary Examiner* — Stuart Hendrickson
*Assistant Examiner* — Daniel Berns
(74) *Attorney, Agent, or Firm* — Womble Carlyle Sandridge & Rice LLP

(57) ABSTRACT

A wet desulfurizing method for removal of $H_2S$ from gaseous stream at normal temperature, the method including: (a) contacting and reacting the gaseous stream containing $H_2S$ with a suspension containing desulfurizer in a desulfurization reactor; (b) leading the suspension containing waste agent produced by desulfurizing of desulfurizer after the reaction in step (a) to a regenerative reactor, and regenerating the waste agent using an oxygen-containing gas; (c) leading the suspension containing desulfurizer regenerated in step (b) to the desulfurization reactor in step (a), and contacting and reacting with the gaseous stream containing $H_2S$. A simple method for removing hydrogen sulfide from gas at room temperature and normal pressure, which features high desulfurization rate and low cost.

7 Claims, 1 Drawing Sheet

(56) References Cited

FOREIGN PATENT DOCUMENTS

| | | | |
|---|---|---|---|
| CN | 1312132 | 9/2001 | |
| CN | 1368537 | 9/2002 | |
| CN | 1114462 | 7/2003 | |
| CN | 1136045 | 1/2004 | |
| CN | 1539545 | 10/2004 | |
| CN | 1704144 | 12/2005 | |
| CN | 101070491 | 11/2007 | |
| CN | 101584962 | 11/2009 | |
| CN | 101585556 | 11/2009 | |
| CN | 101585557 | 11/2009 | |
| CN | 101767828 | 7/2010 | |
| EP | 0215505 | 3/1987 | |
| EP | 0628339 | 12/1994 | |
| EP | 1857414 | 11/2007 | |
| GB | 838571 | * 6/1960 | |
| JP | 59039345 | 3/1984 | |
| JP | 6262066 | 9/1994 | |
| JP | 10259026 | 9/1998 | |
| WO | WO 2006088083 | 8/2006 | |
| WO | WO 2009/150232 | 12/2009 | |
| WO | WO 2010081290 | 7/2010 | |

OTHER PUBLICATIONS

Gong Zhi-jian et al., "Research on Desulfurization Activity of Iron Oxyhydroxide Prepared with Different Alkali Ratios", *Coal Science and Technology*, 34(10): 44-46 (2006).

Gong Zhi-jian et al., "Research on Desulfurization Activity of Iron Oxide Hydroxides Prepared with Different Methods", *Coal Conversion*, 29 (3):71-74 (2006).

Liu and Liu, "The Characterization of an Active Components in a kind of Iron Oxides Desulfurizer with High Sulfur Capacity", National Information Center of Gas Purification Proceedings on Technical Seminar. 2006, pp. 107-111.

Office Action mailed May 3, 2012, for U.S. Appl. No. 13/172,893.
Response filed Nov. 5, 2012 for U.S. Appl. No. 13/172,893.
Final Office Action mailed Nov. 29, 2012 for U.S. Appl. No. 13/172,893.
Office Action mailed Aug. 28, 2012 for U.S. Appl. No. 12/769,761.
Response filed Sep. 27, 2012 for U.S. Appl. No. 12/769,761.
Office Action mailed Oct. 12, 2012 for U.S. Appl. No. 12/769,761.
Response filed Feb. 12, 2013 for U.S. Appl. No. 12/769,761.
Office Action mailed Jun. 12, 2012 for U.S. Appl. No. 13/174,728.
Response filed Jul. 18, 2012 for U.S. Appl. No. 13/174,728.
Office Action mailed Jul. 27, 2012 for U.S. Appl. No. 13/174,728.
Response filed Jan. 23, 2013 for U.S. Appl. No. 13/174,728.
Office Action mailed Mar. 31, 2009 for U.S. Appl. No. 11/805,727.
Response filed Jun. 30, 2009 for U.S. Appl. No. 11/805,727.
Final Office Action mailed Oct. 28, 2009 for U.S. Appl. No. 11/805,727.
Response to Final Office Action filed Dec. 14, 2009 for U.S. Appl. No. 11/805,727.
Restriction Requirement mailed Jun. 29, 2012 for U.S. Appl. No. 13/174,743.
Response to Restriction requirement filed Jul. 29, 2012 for U.S. Appl. No. 13/174,743.
Office Action mailed Aug. 14, 2012 for U.S. Appl. No. 13/174,743.
Response to Office Action filed Feb. 14, 2013 for U.S. Appl. No. 13/174,743.
Notice of Allowance for U.S. Appl. No. 11/805,727 mailed Jan. 7, 2010.
Issue Fee Transmittal for U.S. Appl. No. 11/805,727 filed Apr. 7, 2010.
Issue Notification for U.S. Appl. No. 11/805,727, mailed Apr. 28, 2010.
Supplementary European Search Report and Search Opinion for EPO application No. 09845385.5, dated Nov. 5, 2012.
Eurasian Patent Office Action dated Feb. 15, 2013, for EA application No. 201171473.
Multiple-Site Adsorption of Cd, Cu, Zn, and Pb on Amorphous Iron Oxyhydroxide, Mark M. Benjamin and James O. Leckie, "Journal of Colloid and Interface Science,", vol. 79, No. 1, Jan. 1981.
European Extended Search Report for application No. PCT/CN2009001598, dated Jun. 25, 2012.
European Extended Search Report for application No. PCT/CN2009001597, dated May 28, 2012.
European Extended Search Report for application No. PCT/CN2009001596, dated Jun. 25, 2012.
European Extended Search Report for application No. PCT/CN2009001595, dated Jun. 25, 2012.
European Extended Search Report for application No. PCT/CN2009001594, dated Nov. 11, 2012.
Eurasian Patent Office Action dated Feb. 15, 2013, for EA application No. 201170905.
Eurasian Patent Office Action dated Mar. 21, 2013, for EA application No. 201170839.
Eurasian Patent Office Action dated Jan. 17, 2013, for EA application No. 201170904.
Eurasian Patent Office Action dated Jan. 17, 2013, for EA application No. 201170903.
Eurasian Patent Office Action dated Feb. 15, 2013, for EA application No. 201171473.

* cited by examiner

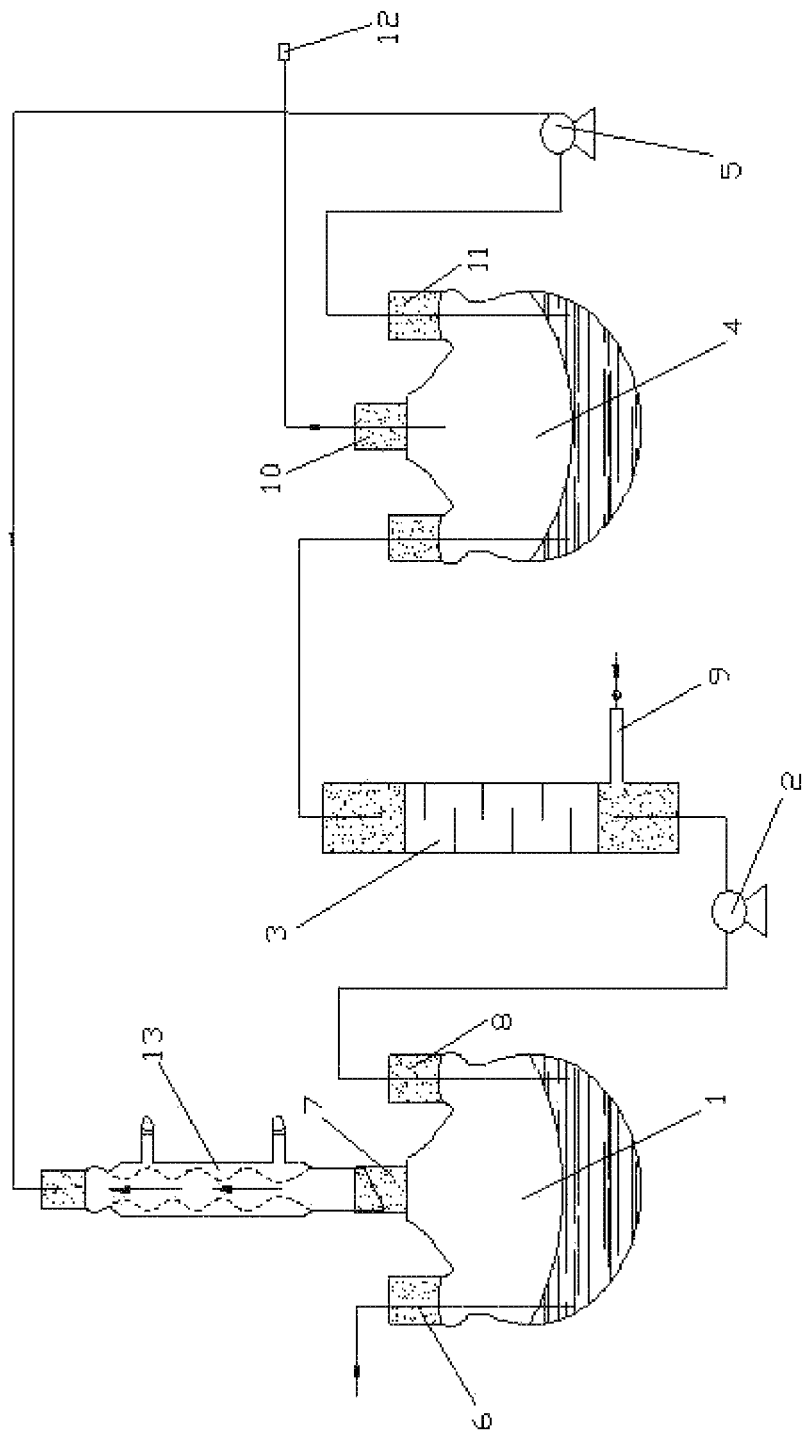

METHOD FOR REMOVING HYDROGEN SULFIDE FROM GASEOUS STREAM AT NORMAL TEMPERATURE

CROSS-REFERENCE TO RELATED APPLICATIONS

This application is a continuation of International Patent Application No. PCT/CN2009/001597, with an international filing date of Dec. 30, 2009, designating the United States, now pending, and further claims priority benefits to Chinese Patent Application No. 200810247540.4, filed Dec. 30, 2008. The contents of all of the aforementioned applications, including any intervening amendments thereto, are incorporated herein by reference.

BACKGROUND OF THE INVENTION

1. Field of the Invention

This invention relates to a method for removing hydrogen sulfide from gas at room temperature and normal pressure, which is a wet desulfurization method.

2. Description of the Related Art

The methods of gas desulfurization are generally divided into two categories. One is called dry desulfurization with a high desulfurization rate, while the other is called wet desulfurization with high processing capacity, but low desulfurization rate.

Wet desulfurization is a common desulfurization method used in different fields, with a very similar desulfurization method.

The alkanolamine purification method is the most commonly used desulfurization method in the field of oil refining. Desulfurization with the alkanolamine purification method is a typical absorption-regeneration reaction method. In this method, the weak alkaline solution is used as the absorbent when absorbing the hydrogen sulfide in the absorption tower (the carbon dioxide and other composition containing sulphur are absorbed at the same time). The water solution (rich liquid) is desorbed in the regeneration tower after being heated under normal air pressure, so as to regenerate the solution. The poor liquid after regeneration is cooled and transferred into the absorption tower for recycling, and the acid gas from the top of the absorption tower is transferred to sulphur recycling device after condensation and liquid separation for recycling the sulphur.

The disadvantage of alkanolamine purification method are as following:

(1) The alkanolamine compounds are with high vapour tension, so that it can easily be taken away by the gas purified.
(2) The alkanolamine compound solution is apt to sparkle. It may cause the difficulty of handling, so as to decrease the processing capability of the device, increase the losses of solvent, and decrease the purification rate.
(3) The method is not selective to the acid gas, and also works on carbon dioxide.
(4) The method gains a low desulfurization rate.

During the course of gas production with coal as the raw composition, the gas produced contains considerable $H_2S$ and a small amount of organic sulphur and unsaturated hydrocarbon. Several wet desulfurization methods that are commonly used are described as below:

1. Rectisol Wash Method

The rectisol wash method is one of the physical absorption methods in wet desulfurization methods. The principle of this method is that the compositions used such as $CO_2$, $H_2S$, Organic sulphur, cyanide, and unsaturated hydrocarbon are highly dissolved in methanol under high air pressure and low temperature, and can be desorbed from the methanol when air pressure decreases, so that the compositions can be removed from the gas. The method comprises the following steps: firstly, raw gas at the low section of the absorption tower is washed with methanol solution at the temperature of $-70°$ C.; secondly, the $CO_2$ and the $H_2S$ in the raw gas are absorbed and the temperature of the methanol rises; the solution flows out of the absorption tower from the bottom section, and enters the top section of the methanol regeneration tower; at the moment, the pressure drops; then partial $CO_2$ and $H_2S$ are desorbed out due to the drop of pressure and overflows from the top of the tower, meanwhile, the methanol solution is cooled down to the temperature of $-35°$ C. In the regeneration tower, with the solution flowing downwards, the air pressure drops to 0.02 MPa, then the $CO_2$ and the $H_2S$ desorbed are pumped out by a pump, meanwhile, the methanol solution is cooled down to $-70°$ C.; finally, the $CO_2$ and the $H_2S$ are transferred by the pump to the top of lower section of the absorption tower for recycling.

The disadvantage of this method is that the method needs to be conducted at a high air pressure and low temperature, in addition, the process is very complicated, has a very high requirement for the composition quality of device, and may cause a huge loss of methanol solution.

2. The Improved Stretford Method (ADA)

The Stretford method is a chemical absorption method in wet desulfurization method. The dilute sodium carbonate solution is only added with anthraquinone disulphonate as the desulfurizer; wherein, sodium carbonate solution is used as the absorbent, and anthraquinone disulphonate is used as the catalyst. In order to improve the reaction rate, a certain amount of vanadate is added to the desulfurizer, so that it is called the improved ADA. The improved ADA started to be adopted from 1960's and has become one of the main gas desulfurization methods.

The detailed method of the improved ADA comprise the following steps: Firstly, the gas enters the absorption tower from the bottom section of the tower, the desulfurization solution is sprayed into the tower from the top section of the tower, and the $H_2S$ in the gas is absorbed by the solution via gas-liquid countercurrent contact; Secondly, the gas desulfurized overflows from the top of the absorption tower. Meanwhile, air is introduced into the bottom of the regeneration tower, so that the solution can be regenerated; then the regenerated solution is transferred into the absorption tower for recycling; after that, the sulphur foam collected in the reaction groove is put in the collection groove; Finally, the sulphur foam is pressed into the sulphur foam groove by mean of compressed air.

The disadvantages of this method are described as below:
(1) It may cause considerable loss of sodium carbonate, and needs to provide a sustaining supply thereof.
(2) During the recycling of the solution, more and more sodium hyposulfite and sodium thiocyanate without the value in use will be collected, so as to drop the effect of desulfurization.

3. The Sulfolane Method

In the sulfolane Method, the blended water solution of sulfolane and alkylalkanolamine is used as the absorbent, and the acid gas such as $CO_2$ and $H_2S$ is physically dissolved in the sulfolane. Under the same circumstance, the $H_2S$ in the sulfolane solution gains a solubility seven times of that in water. The method is a physical absorption method belonging to wet desulfurization method. As the solution contains 20%-30% ethanolamine, an unstable complex compound is generated after the reaction between ethanolamine and H₂S, so that this absorption method is the combination of physical absorption method and chemical method. Under a certain air pressure, the absorbing ability of sulfolane may increase with the rising of the air pressure of the acid gas.

The working pressure in the absorption tower used in the sulfolane method is generally 7.0 MPa, so that it is not commonly used in desulfurization under a high air pressure.

4. The Selexol Method.

In the selexol method, Polyethylene glycol dimethyl ether is used as the absorbent. Selexol is the product name of Polyethylene glycol dimethyl ether. The absorption in this method is conducted under a high air pressure, so that this method now is eliminated.

Above all, the wet desulfurization method in the prior art generally requires a harsh desulfurization condition and high quality devices, and has a complicated procedure; in addition, it causes the problems such as a considerable loss of consumption, and very bad effect of desulfurization. Furthermore, it has been mentioned in a lot of documents that amorphous iron oxide hydroxide can be used as the desulfurizer, but the content of amorphous iron oxide hydroxide in the amorphous iron oxide hydroxide desulfurizer produced via the prior art is very low (approximately 40%). However, the content of other iron oxides, that are not regeneratable, such as ferriferous oxide and ferric oxide and other iron oxide hydroxide is very high, and this causes these amorphous iron oxide desulfurizers not to be regeneratable, so that it may not be adopted in wet recycling desulfurization.

SUMMARY OF THE INVENTION

One of the objectives of this invention is to provide a method for removing hydrogen sulfide from gas at room temperature and normal pressure, which has a simple procedure, high desulfurization rate, and low cost.

The other objective is to provide a recycling method in which the desulfurizer used in the process for removing hydrogen sulfide in gas can be regenerated and reused.

A wet desulfurization method for removing hydrogen sulfide from gas, comprising the following steps which form a circulation:
(a) contacting and reacting the gaseous stream containing H₂S with a suspension containing desulfurizer in a desulfurization reactor;
(b) leading the suspension containing waste agent produced by desulfurizing of desulfurizer after the reaction in step (a) to a regenerative reactor, and regenerating the waste agent by using an oxygen-containing gas; and
(c) leading the suspension containing desulfurizer regenerated in step (b) to the desulfurization reactor in step (a), and contacting and reacting with the gaseous stream containing H₂S.

The method further comprises the step of blending said suspension containing desulfurizer with said gas containing hydrogen sulfide in the static mixer before step (a).

The method further comprises the step of extracting elemental sulphur from the regeneration reactor during the course of regenerating the waste agent.

The weight proportion of the desulfurizer in the suspension and the water ranges from 1:100 to 1:5 in step (a).

The desulfurizer is a composition containing amorphous iron oxide hydroxide.

The weight content of the amorphous iron oxide hydroxide in the composition ranges from 65% to 100%, and the rest ingredients are water and reaction byproduct.

The principle of the desulfurization of amorphous iron oxide hydroxide and regeneration is:

$2FeOOH + 3H_2S \rightarrow Fe_2S_3 \cdot H_2O + 3H_2O$, $Fe_2S_3 \cdot H_2O + 3/2 O_2 \rightarrow 2FeOOH + 3S$.

The pH value of the composition in the regeneration reactor ranges from 6.5 to 7.5.

In step (a), the granularity of the desulfurizer ranges from 20 μm to 160 μm.

In step (b), the gas containing oxygen is air.

This invention has the following advantages:

1. The wet desulfurization process for removing H₂S from gas in this invention is conducted at room temperature and under normal pressure, and there is no need for the help of cooling or heating device, so that the process and the device used are very simple. The principle of desulfurization in this invention is different from the prior art, which reduces the energy consumption, enhance the desulfurization rate, and drops the cost.

2. In the wet desulfurization process for removing H₂S from gas introduced in this invention, the composition containing amorphous iron oxide hydroxide is used as desulfurizer. As the content of amorphous iron oxide hydroxide is very high, and the content of other iron oxides or iron oxide hydroxide in other crystalline states that are not regeneratable is very low, so that the desulfurizer can regenerate for recycling. Therefore, it resolves a problem that there is huge loss of composition used in the existing chemical or physical desulfurization process, and saves a lot of resources, in addition, the rate of desulfurization and the rate of purification in this invention are both very high.

3. The pH value in the desulfurization system of this invention is stable, and is kept between 6.5 and 7.5. In this range of pH value, there is no impurity generated, such as other types of sulfide or sulphate, when the air is used to oxidize the waste agent for regeneration, and this is in favour of the regeneration of the waste agent and the whole process of recycling.

4. In the process for removing H₂S from gas of this invention, the weight proportion of the desulfurizer and the water in the suspension ranges from 1:100 to 1:5, and in this range of weight proportion, the rate of circulating desulfurization and purification are both very high.

5. The granularity of the desulfurizer in this invention preferably ranges from 20 μm to 160 μm, and this helps gain high desulfurization rate of the desulfurizer, high regeneration rate, and high working efficiency.

BRIEF DESCRIPTION OF THE DRAWINGS

Detailed description will be given below in conjunction with accompanying drawings and implementation examples, in which:

The single FIGURE illustrates an experimental device used in this invention.

REFERENCE CHARACTERS

1—Regeneration reactor, 2—feeding pump, 3—static mixer, 4—desulfurization reactor, 5—discharging pump, 6—air inlet, 7—supply inlet, 8—seriflux outlet, 9—gas inlet, 10—purified gas outlet, 11—slurry outlet, 12—sampling outlet, 13—condenser pipe.

DETAILED DESCRIPTION OF THE EMBODIMENTS

The following implementation examples give a further detailed description of this invention, but are not a limitation of this invention.

Example 1

The process for preparing the composition containing amorphous iron oxide hydroxide comprises the following steps:

Firstly, the $FeSO_4.7H_2O$ water solution prepared with 456 g $FeSO_4.7H_2O$ was put in a reactor, and NaOH water solution prepared with 135 g NaOH was added and the mixture was stirred simultaneously; then the reaction was carried out at a temperature not exceeding 70° C., and the temperature was controlled through controlling the feeding rate of NaOH water solution; after the reaction, the solution in the reactor was filtered, and the filter cake was washed with water until the content of $Na^+$ was less than 0.5%; after that, the filter cake was prepared into water suspension containing 30% solid in weight content, and the air was introduced into the solution for oxidization until the $Fe^{2+}/Fe_t$ was less than 1%; then the suspension was filtered, and the composition containing amorphous iron oxide hydroxide was obtained after the filtered composition was dried at the temperature of 90° C.; wherein, the weight content of the amorphous iron oxide hydroxide was 85%, the other ingredients were $Na_2SO_4$, water and $TiO_2$ ($TiO_2$ was the impurity of the industrial $FeSO_4.7H_2O$), the sulphur capacity of the amorphous iron oxide hydroxide was 53%. The $Fe_t$ was the total content of Ferrum element, and $Fe^{2+}/Fe_t$ was determined via phenanthroline spectrophotometry, the content of $Na^+$ was determined via flame photometry, which were the same meaning in the following examples.

The process for removing the hydrogen sulfide from the gas was described as below:

Firstly, the composition containing 50 g amorphous iron oxide hydroxide with the granularity of 40-160 μm was put into the regeneration reactor 1 and 500 mL water was added to the reactor; then stirring them into seriflux; after that, starting the feeding pump 2 so as to allow the seriflux to flow into the static mix 3 via the seriflux outlet 8 from the regeneration reactor 1 with the speed of 1.6 L/h; and meanwhile, the gas containing hydrogen sulfide (high-purity nitrogen containing 4% hydrogen sulfide) was introduced into the static mixer 3 via the gas inlet 9 with the speed of 3 L/h (at this stage, the seriflux and the gas had started to be in reaction with each other), then flowed out of the static mixer 3 and entered the desulfurization reactor 4, after that the hydrogen sulfide further reacted with The amorphous iron oxide hydroxide, and the gas desulfurized escaped from the desulfurization reactor 4 via the gas outlet 10; the gas escaping was collected at the sample outlet 12 or transferred to the place where it was applied. The hydrogen sulfide concentration of sample collected was qualitatively checked via $AgNO_3$ solution, and quantitatively determined via gas chromatography, and the result indicated the hydrogen sulfide concentration stayed between 10-50 ppm. When the amount of slurry stored in the desulfurization reactor 4 reached 200 mL, the discharging pump 5 was started, and its feeding rate was regulated to the value which was the same as that of feeding pump 2, so as to allow the slurry to flow out via the slurry outlet 11 and allow it to enter the regeneration reactor 1 via the condenser pipe 13 and supply inlet 7. Then compressed air was introduced into the regeneration reactor 1 via the air inlet 6, so as to regenerate the spent composition which was generated after the desulfurization of the amorphous iron oxide hydroxide that circularly enters the regeneration reactor 1 from the desulfurization reactor 4. The amorphous iron oxide hydroxide regenerated entered the static mixer 3 (the air escaped from the condenser pipe 13) via the seriflux outlet 8. Therefore, the process for desulfurization formed a circulation. When the amount of elemental sulphur generated during the course of regenerating the spent composition in the regeneration reactor 1 reached about 150 g, the feeding pump 2 and discharging pump 5 were connected to another reactor for recycling, and the sulphur in the reactor 1 was extracted for recycling. In above mentioned recycling process, the pH value of the seriflux was kept between 6.5 and 7.5.

Example 2

The process for preparing the composition containing amorphous iron oxide hydroxide comprises the following steps:

Firstly, the water solution prepared with $Fe(NO_3)_2.6H_2O$ was put in a reactor, and the water solution with solid NaOH was put into the reactor and the mixture was stirred simultaneously; then the reaction was carried out at a temperature between 30° C. and 40° C., which was controlled through controlling the feeding rate of NaOH water solution; and the pH value of the solution is controlled at 7.5, when the reaction was completed; after the reaction, the solution in the reactor was filtered, and the filter cake was washed with water until the content of $Na^+$ is less than 0.5%; after that, the filter cake was prepared into water suspension containing 10% solid in weight content, and the air was introduced into the solution for oxidization until the $Fe^{2+}/Fe_t$ was less than 1%; then the suspension was filtered, and the composition containing amorphous iron oxide hydroxide was obtained after the filtered composition was dried at the temperature of 70° C.; wherein, the weight content of the amorphous iron oxide hydroxide was 100%, and the sulphur capacity of the amorphous iron oxide hydroxide was 62%.

In this example, the amount of hydroxide was controlled by controlling the pH value of the reaction solution. More specifically, it was controlled by controlling the weight proportion of feeding for the two types of compositions.

The process for removing the hydrogen sulfide from the gas was described as below:

Firstly, 120 g amorphous iron oxide hydroxide power with the granularity of 40-160 μm was put into the reactor 1 and 600 mL water was put into the reactor; then stirring them into seriflux; after that, starting the feeding pump 2 so as to allow the seriflux to flow into the static mix 3 via the seriflux outlet 8 from the regeneration reactor 1 with the speed of 1.6 L/h; and meanwhile, the gas containing hydrogen sulfide (high-purity nitrogen containing 4% hydrogen sulfide) was introduced into the static mixer 3 via the gas inlet 9 with the speed of 3 L/h, then flowed out of the static mixer 3 and entered the desulfurization reactor 4.

After that the hydrogen sulfide further reacted with the amorphous iron oxide hydroxide, and the gas desulfurized escaped from the desulfurization reactor 4 via the gas outlet 10; the gas escaping was collected at the sample outlet 12 or transferred to the place where it was applied. The hydrogen sulfide concentration of sample collected was qualitatively checked via $AgNO_3$ solution, and quantitatively determined via gas chromatography, and the result indicated the hydrogen sulfide concentration stayed between 30 ppm and 50 ppm. When the amount of slurry stored in the desulfurization reactor 4 reached 200 mL, the discharging pump 5 was started, and its feeding rate was regulated to the value which was the same as that of feeding pump 2, so as to allow the slurry to flow out via the slurry outlet 11 and allow it to enter the regeneration reactor 1 via the condenser pipe 13 and supply inlet 7. Then compressed air was introduced into the regeneration reactor 1 via the air inlet 6, so as to regenerate the spent composition which was generated after the desulfurization of the amorphous iron oxide hydroxide circularly entering the regeneration reactor 1 from the desulfurization reactor 4. The amorphous iron oxide hydroxide regenerated entered the static mixer 3 (the air escaped from the condenser pipe 13) via the seriflux outlet 8. Therefore, the process for desulfurization formed a circulation. When the amount of elemental sulphur generated during the course of regenerating the spent composition in the regeneration reactor 1 reached about 300 g, the feeding pump 2 and discharging pump 5 were connected to another reactor for recycling, and the sulphur in the reactor 1 was extracted for recycling. In above mentioned recycling process, the pH value of the seriflux was kept between 6.5 and 7.5.

Example 3

The process for preparing the composition containing amorphous iron oxide hydroxide comprises the following steps:

Firstly, the water solution prepared with KOH was put in a reactor, and the water solution prepared with $FeCl_2$ was put into the reactor and the mixture was stirred simultaneously; then the reaction was carried out at a temperature between 40° C. and 50° C., which was controlled through controlling the feeding rate of $FeCl_2$ water solution; and the pH value of the solution was controlled at 8, when the reaction was completed; after the reaction, the solution in the reactor was filtered, and the filter cake was washed with water until the content of $K^+$ was less than 0.5%; after that, the filter cake was prepared into water suspension containing 15% solid in weight content, and the air was introduced into the solution for oxidization until the $Fe^{2+}/Fe_t$ was less than 1%; then the suspension was filtered, and the composition containing amorphous iron oxide hydroxide was obtained after the filtered composition was dried at the temperature of 60° C.; wherein, the weight content of the amorphous iron oxide hydroxide was 92%, and the other ingredients were KCl, water and unknown impurity; the sulphur capacity of the amorphous iron oxide hydroxide was 57%.

The process for removing the hydrogen sulfide from the gas is described as below:

Firstly, 20 g amorphous iron oxide hydroxide composition produced via the abovementioned process, with the granularity of 40-160 μm, and 1000 mL water were put into the reactor 1; then stirring them into seriflux; after that, starting the feeding pump 2 so as to allow the seriflux to flow into the static mix 3 via the seriflux outlet 8 from the regeneration reactor 1 with the speed of 1.6 L/h; meanwhile, the gas containing hydrogen sulfide (high-purity nitrogen containing 4% hydrogen sulfide) was introduced into the static mixer 3 via the gas inlet 9 with the speed of 3 L/h, then flowed out of the static mixer 3 and entered the desulfurization reactor 4.

After that the hydrogen sulfide further reacted with the amorphous iron oxide hydroxide, and the gas desulfurized escaped from the desulfurization reactor 4 via the gas outlet 10; the gas escaping was collected at the sample outlet 12 or transferred to the place where it was applied. The hydrogen sulfide concentration of sample collected was qualitatively checked via $AgNO_3$ solution, and quantitatively determined via gas chromatography, and the result indicated the hydrogen sulfide concentration stayed between 100 ppm and 150 ppm. When the amount of slurry stored in the desulfurization reactor 4 reached 200 mL, the discharging pump 5 was started, and its feeding rate was regulated to the value which was the same as that of feeding pump 2, so as to allow the slurry to flow out via the slurry outlet 11 and allow it to enter the regeneration reactor 1 via the condenser pipe 13 and supply inlet 7. Then compressed air was introduced into the regeneration reactor 1 via the air inlet 6, so as to regenerate the spent composition which was generated after the desulfurization of the amorphous iron oxide hydroxide circularly entering the regeneration reactor 1 from the desulfurization reactor 4. The amorphous iron oxide hydroxide regenerated entered the static mixer 3 (the air escaped from the condenser pipe 13) via the seriflux outlet 8. Therefore, the process for desulfurization formed a circulation. When the amount of elemental sulphur generated during the course of regenerating the spent composition in the regeneration reactor 1 reached about 60 g, the feeding pump 2 and discharging pump 5 were connected to another reactor for recycling, and the sulphur in the reactor 1 was extracted for recycling. In above mentioned recycling process, the pH value of the seriflux was kept between 6.5 and 7.5.

Example 4

The process for preparing the composition containing amorphous iron oxide hydroxide comprises the following steps:

Firstly, the water solution prepared with $FeCl_2$ was prepared and put in a reactor, solid $Ca(OH)_2$ was put into the reactor and the mixture was stirred simultaneously; then the reaction was carried out at a temperature between 40° C. and 50° C., which was controlled through controlling the feeding rate of $Ca(OH)_2$ solid; and the pH value of the solution was controlled at 8, when the reaction was completed; after the reaction, the solution in the reactor was filtered, and the filter cake was washed with water until the content of $Cl^-$ was less than 0.5%; after that, the filter cake was prepared into water suspension containing 5% solid in weight content, and the air was introduced into the solution for oxidization until the $Fe^{2+}/Fe_t$ was less than 1%; then the suspension was filtered, and the composition containing amorphous iron oxide hydroxide was obtained after the filtered composition was dried at the temperature of 80° C.; wherein, the weight content of the amorphous iron oxide hydroxide were 80%, and the other ingredients were $CaCl_2$ and water; the sulphur capacity of the amorphous iron oxide hydroxide was 50%. Wherein, the content of $Cl^-$ was measured by mercuric thiocyanate colorimetry.

The process for removing the hydrogen sulfide from the gas was described as below:

Firstly, 5 g amorphous iron oxide hydroxide composition produced via the abovementioned process, with the granularity of 40-160 μm, and 500 mL water were put into the reactor 1; then stirring them into seriflux; after that, starting the feeding pump 2 so as to allow the seriflux to flow into the static mix 3 via the seriflux outlet 8 from the regeneration reactor 1 with the speed of 0.8 L/h; and meanwhile, the gas containing hydrogen sulfide (high-purity nitrogen containing 4% hydrogen sulfide) was introduced into the static mixer 3 via the gas inlet 9 with the speed of 1 L/h, then flowed out of the static mixer 3 and enters the desulfurization reactor 4.

After that the hydrogen sulfide further reacted with the amorphous iron oxide hydroxide, and the gas desulfurized escaped from the desulfurization reactor 4 via the gas outlet 10; the gas escaping was collected at the sample outlet 12 or transferred to the place where it is applied. The hydrogen sulfide concentration of sample collected was qualitatively checked via $AgNO_3$ solution, and quantitatively determined via gas chromatography, and the result indicated the hydrogen sulfide concentration stayed between 200 ppm and 250 ppm. When the amount of slurry stored in the desulfurization reactor 4 reached 200 mL, the discharging pump 5 was started, and its feeding rate was regulated to the value which was the same as that of feeding pump 2, so as to allow the slurry to flow out via the slurry outlet 11 and allow it to enter the regeneration reactor 1 via the condenser pipe 13 and supply inlet 7. Then compressed air was introduced into the regeneration reactor 1 via the air inlet 6, so as to regenerate the spent composition which was generated after the desulfurization of the amorphous iron oxide hydroxide circularly entering the regeneration reactor 1 from the desulfurization reactor 4. The amorphous iron oxide hydroxide regenerated entered the static mixer 3 (the air escaped from the condenser pipe 13) via the seriflux outlet 8. Therefore, the process for desulfurization formed a circulation. When the amount of elemental sulphur generated during the course of regenerating the spent composition in the regeneration reactor 1 reached about 15 g, the feeding pump 2 and discharging pump 5 were connected to another reactor for recycling, and the sulphur in the reactor 1 was extracted for recycling. In above mentioned recycling process, the pH value of the seriflux was kept between 6.5 and 7.5.

In the above mentioned examples, the sulphur capacity of the composition containing amorphous iron oxide hydroxide is determined via the following process: the standard gas containing 40000 ppm $H_2S$ was used to determined the sulphur capacity under the room temperature (−5° C. to 45° C.) and normal pressure (one standard atmosphere pressure). The apparatus used for determination was WK-2C integrated microcoulometer (manufactured by Jiangsu Electroanalytical Instrument Factory), which had a minimal measurement volume of 0.2 ppm. The devices for this invention are not limited in above embodiments, any device that achieves the purpose of each step is suitable in this invention.

While particular embodiments of the invention have been shown and described, it will be obvious to those skilled in the art that changes and modifications may be made without departing from the invention in its broader aspects, and therefore, the aim in the appended claims is to cover all such changes and modifications that fall within the true spirit and scope of the invention.

The invention claimed is:

1. A wet desulfurization method for removing hydrogen sulfide from a gaseous stream, comprising the following steps:
   (a) contacting and reacting the gaseous stream comprising hydrogen sulfide with a suspension comprising a desulfurizer comprising amorphous iron oxide hydroxide in a desulfurization reactor;
   (b) removing suspended waste agent from the desulfurization reactor to a regeneration reactor, and regenerating desulfurizer from the suspended waste agent using an oxygen-containing gas, the pH value of the suspended waste agent in the regeneration reactor ranging from 6.5 to 7.5; and
   (c) removing suspended desulfurizer comprising amorphous iron oxide hydroxide regenerated in step (b) to the desulfurization reactor in step (a), and contacting and reacting the gaseous stream comprising hydrogen sulfide with the suspended desulfurizer.

2. The method of claim 1, further comprising the step of blending the suspension comprising the desulfurizer with the gaseous stream comprising hydrogen sulfide in a static mixer before step (a).

3. The method of claim 1, wherein the weight proportion of the desulfurizer to water in the suspension ranges from 1:100 to 1:5 in step (a).

4. The method of claim 1, wherein the amorphous iron oxide hydroxide constitutes between 65% to 100% weight percent of the desulfurizer.

5. The method of claim 1, wherein step (b) further comprises extracting elemental sulfur from the regeneration reactor.

6. The method of claim 1, wherein the desulfurizer possesses a granularity ranging from 20 μm to 160 μm in step (a).

7. The method of claim 1, wherein the oxygen-containing gas is air.

* * * * *